(12) United States Patent
Sigal et al.

(10) Patent No.: US 8,185,909 B2
(45) Date of Patent: May 22, 2012

(54) PREDICTIVE DATABASE RESOURCE UTILIZATION AND LOAD BALANCING USING NEURAL NETWORK MODEL

(75) Inventors: Lev Sigal, Karmiel (IL); Alexander Glauberman, Motzkin (IL)

(73) Assignee: SAP AG, Walldorf (DE)

( * ) Notice: Subject to any disclaimer, the term of this patent is extended or adjusted under 35 U.S.C. 154(b) by 1389 days.

(21) Appl. No.: 11/682,866

(22) Filed: Mar. 6, 2007

(65) Prior Publication Data
US 2008/0222646 A1  Sep. 11, 2008

(51) Int. Cl.
*G06F 9/44* (2006.01)
*G06F 9/50* (2006.01)
*G06F 15/18* (2006.01)
*G06F 17/30* (2006.01)

(52) U.S. Cl. . 718/105; 718/102; 709/226; 707/999.002; 706/12; 706/14; 706/15

(58) Field of Classification Search .................. 718/102, 718/104, 105
See application file for complete search history.

(56) References Cited

U.S. PATENT DOCUMENTS

| | | | | |
|---|---|---|---|---|
| 6,327,622 | B1* | 12/2001 | Jindal et al. | 709/228 |
| 7,177,923 | B2* | 2/2007 | Hossain | 709/223 |
| 7,552,100 | B2* | 6/2009 | Chen | 706/21 |
| 8,051,019 | B2* | 11/2011 | Sigal et al. | 706/21 |
| 2004/0093315 | A1* | 5/2004 | Carney | 706/15 |
| 2004/0139083 | A1* | 7/2004 | Hahn et al. | 707/100 |
| 2004/0177245 | A1* | 9/2004 | Murphy | 713/100 |
| 2004/0225631 | A1* | 11/2004 | Elnaffar et al. | 707/1 |
| 2005/0154789 | A1* | 7/2005 | Fellenstein et al. | 709/223 |
| 2005/0177549 | A1* | 8/2005 | Hornick | 707/1 |
| 2006/0224588 | A1* | 10/2006 | Laonipon et al. | 707/8 |
| 2007/0143765 | A1* | 6/2007 | Aridor et al. | 718/104 |
| 2007/0168678 | A1* | 7/2007 | Meenakshisundaram | 713/189 |
| 2008/0065574 | A1* | 3/2008 | Hu | 706/20 |
| 2008/0172673 | A1* | 7/2008 | Naik | 718/104 |

OTHER PUBLICATIONS

El-Abd et al., "A Neural Network Approach for Dynamic Load Balancing in Homogeneous Distributed Systems," IEEE, 1997, pp. 1-8.*

* cited by examiner

*Primary Examiner* — Meng An
*Assistant Examiner* — Benjamin Wu
(74) *Attorney, Agent, or Firm* — Buckley, Maschoff & Talwalkar LLC

(57) ABSTRACT

A preemptive neural network database load balancer configured to observe, learn and predict the resource utilization that given incoming tasks utilize. Allows for efficient execution and use of system resources. Preemptively assigns incoming tasks to particular servers based on predicted CPU, memory, disk and network utilization for the incoming tasks. Direct write-based tasks to a master server and utilizes slave servers to handle read-based tasks. Read-base tasks are analyzed with a neural network to learn and predict the amount of resources that tasks will utilize. Tasks are assigned to a database server based on the predicted utilization of the incoming task and the predicted and observed resource utilization on each database server. The predicted resource utilization may be updated over time as the number of records, lookups, images, PDFs, fields, BLOBs and width of fields in the database change over time.

11 Claims, 5 Drawing Sheets

PREDICTIVE DATABASE RESOURCE UTILIZATION AND LOAD BALANCING USING NEURAL NETWORK MODEL

BACKGROUND OF THE INVENTION

1. Field of the Invention

Embodiments of the invention described herein pertain to the field of computer systems. More particularly, but not by way of limitation, one or more embodiments of the invention enable a preemptive neural network database load balancer.

2. Description of the Related Art

Load balancers are software or hardware components that are used to spread tasks between multiple computing resources. Load balancing is performed to obtain scalability, decrease latency, and maximize performance for example. Load balancers may be utilized with server farms or clusters. Many load balancers can operate when a given server fails or during periods of server maintenance for example. Providing access to the computing resources when a server is not accessible allows for increased availability, or "up time" of the computing resources. Many types of load balancing are currently used including round-robin, least connections, least response time, least bandwidth, least packets, source Internet Protocol (IP), token and Uniform Resource Locator (URL) hashing for example.

Current scalable database clusters rely on load balancers that are reactive and not predictive. All of the algorithms mentioned in the previous paragraph as reactive algorithms. This results in poor system performance and/or increased hardware costs to account for the inefficiency of the load balancing algorithms currently in use. Load balancing algorithms currently in use do not preemptively assign incoming tasks to particular servers based on predicted Central Processing Unit (CPU) and/or predicted memory/disk/network utilization for the incoming tasks. In other words, the currently utilized algorithms are not preemptive. Furthermore, in architectures that include a heterogeneous mix of writeable and readable database servers, i.e., master and slave database servers respectively, there are no known load balancers that preemptively schedule tasks based on the read or write characteristic of a particular task. Specifically, there are no known load balancers that direct write-based requests or tasks to a master for example. Furthermore, there are no known load balancers that utilize a neural network to learn and predict which read-based tasks will utilize predicted amounts of resources such as CPU and/or memory/disk/network and assign the task to a database server in a cluster based on the predicted utilization.

The most basic algorithms for load balancing database clusters include reactive algorithms such as round robin or least connection. These load balancing algorithms consider all database servers in a cluster as equal and distribute client requests between the database servers in a round-robin manner or based on the information about the number of open connections. Round robin algorithms spread the incoming tasks to the next server in a cluster regardless of the predicted resource utilization of the incoming task. Connection based algorithms spread the incoming task to the server with the least connections regardless of the predicted resource utilization of the incoming task. Neither of these algorithms take into account the particular resources available to each server for example, the number of CPUs in a given server or the amount of memory to predict the future utilization of the servers. Likewise, these methods do not take into consideration the difficulty of tasks running on the servers and their influence on the resource utilization of the server. Current load balancing methodologies also do not take into account the current database characteristics such as the number of records, lookups, images, Portable Document Format (PDF) files, Binary Large Objects (BLOBs) and the widths of the fields for example and hence cannot possibly predict how long a particular task utilizing these parameters will take to execute or how much memory the task would consume. The other algorithms listed above likewise are reactive in nature and in no way predict how long a particular request or task will take, or how resource intensive the task will be in order to choose a server in a cluster to direct the task.

An example of poor distribution occurs when utilizing known load balancing algorithms when an incoming task obtains a connection to a database server executing a "resource-hungry" request (e.g. matching, complicated search, mass record deletion) rather than to a database server executing several simple requests (e.g. record retrievals). In this case traditional load balancing methods lead to asymmetric load balancing between database servers in a cluster. This results in resource allocation that is not optimized for the database application in use. Specifically, the results which occur from the spreading the tasks using known algorithms are random since there is no estimation on a per task level to even resource utilization between servers in cluster.

For example, given a two server cluster, if four incoming tasks include two resource intensive tasks and two light resource utilization tasks, then in the round robin case, there is a good chance that the two resource intensive tasks will execute on the same server in the cluster. In this scenario, the two light resource utilization tasks will execute quickly on the other server which will then stand idle while the other server runs completely utilized. Depending on the order that the tasks arrive, it is possible that each server will obtain a resource intensive task and a light resource utilization task. Thus, the result is random since the result depends on the order in which the tasks arrive at the load balancer. Likewise with the least connection algorithm, one can readily see that the server with the least connections may be executing at least one task that may for example be executing an extremely resource intensive task that may take a tremendous amount of CPU. Using this algorithm, an incoming resource intensive task is still directed to the server with the least connections. Hence, the results of this load balancing algorithm are random since the "size" of the tasks has nothing to do with the number of connections that a server in the cluster currently has.

In addition, as software implementing particular tasks changes over time as companies improve or otherwise alter the application software, there are no known load balancing algorithms that update to better predict resource utilization based on the new task performance characteristics. For example, if the software implementing a particular task becomes more efficient and then utilizes fewer resources for a particular operation, no known load balancing algorithm updates a predicted utilization parameter associated with the particular task. Alternatively, if a particular task is altered to add functionality, which tends to require more resources to operate, there is no known load balancing algorithm that updates a predicted utilization parameter associated with the particular task. Under either scenario, the software changes provide altered predictions for task execution that are not taken into account by any known load balancing algorithm.

Even if known systems were to utilize traditional linear methods of correlating input parameters with predicted resource utilization, these would still not provide satisfactory results since small variations of one input parameter may radically alter the required resource utilization for a particular task. As such, any non-learning based load balancing algorithm would be limited in the quality of predicted utilization and would in general be as haphazard as a round-robin scheme or least connections schemes.

The description of algorithms above is applicable to software based solutions or hardware based solutions that are available from numerous vendors. Although hardware based solutions may be dynamically updated with new firmware, essentially their operation relies on one of the algorithms previously discussed. Specifically, there are no known hardware solutions that preemptively load balance.

For at least the limitations described above there is a need for a preemptive neural network database load balancer.

BRIEF SUMMARY OF THE INVENTION

One or more embodiments of the invention enable a preemptive neural network database load balancer. Embodiments of the invention are predictive in nature and are configured to observe, learn and predict the resource utilization that given incoming tasks utilize. Predictive load balancing allows for efficient execution and use of system resources. Efficient use of system resources allows for lower hardware costs, since the hardware is utilized in a more efficient manner. Embodiments of the invention preemptively assign incoming tasks to particular servers based on predicted CPU, memory, disk and/or network utilization for the incoming tasks. Furthermore, in architectures that include a heterogeneous mix of readable and writeable database servers, i.e., master and slave database servers, embodiments direct write-based tasks to a master server and utilize slave servers to handle read-based tasks. Specifically, read-based tasks are analyzed with a neural network to learn and predict the amount of resources that read-based tasks will utilize such as CPU or memory. In other embodiments read and write based tasks are analyzed with a neural network as well and generally write based tasks analysis is performed in multi-master configurations where more than one server is allowed to write data into a database. Once the predicted resource utilization is formulated for a given incoming task, the task is directed or assigned to a database server based on the predicted resource utilization of the incoming task and the predicted and observed resource utilization on each database server in a cluster.

Embodiments may also be configured to take into account the particular resources available to each server for example, the number of CPUs in a given server or the amount of memory, disk or network throughput available to each server to predict the future utilization of the servers. Task utilization predictions may be updated as the number of records, lookups, images, PDF files, BLOBs and the widths of the fields in the database change over time. Load balancing is optimal when resource utilization is as equal as possible over servers in a cluster. For example, if there are eight servers in a cluster, and 16 total tasks and the CPU utilization of each server is approximately 50%, then balancing is said to be optimal. If the number of tasks is not evenly dividable by the number of servers, then as long as the CPU, memory, disk or network utilization (or whatever resource parameter is being balanced) is roughly equal per task, then balancing is said to be optimal. In either case, preemptive scheduling based on the incoming task maximizes the equality of resource utilization per server.

In addition, embodiments of the invention may be configured to update utilization predictions when software implementing particular tasks is maintained and modified over time. For example, if the software implementing a particular task becomes more efficient and then utilizes fewer resources for a particular operation, embodiments of the invention may update one or more predicted utilization parameters associated with the particular task. Alternatively, if a particular task is altered to add functionality, which tends to require more resources to operate, embodiments of the invention may update one or more predicted utilization parameters associated with the particular task. Under either scenario, the software changes provide altered predictions for task execution that are taken into account using embodiments of the invention. Furthermore, embodiments of the invention may also take into account any other system parameter that changes, for example the particular database version. Updating a database version for example may alter the resource utilization of particular tasks as the database becomes more optimized.

In one or more embodiments a feed-forward back-propagation neural network is utilized to predict completion of incoming tasks. The following tasks are examples of tasks that are analyzed by embodiments of the invention to preemptively load balance:
  Import
  Syndication
  Mass Delete
  Matching
  Recalculate calculated fields
  Search according to expression
  Search with contain operators
  Sorting on main table fields
  Search according to qualifiers and taxonomy attributes Any other task that may cause a significant load on a database server may be analyzed and further utilized by embodiments of the invention to perform load balancing. In other embodiments of the invention, all tasks may be analyzed and utilized for preemptive load balancing.

Embodiments of the invention gather information related to the above list of tasks when the tasks are instantiated by clients utilizing the system. This information, together with the information about resource utilization including CPU, memory, disk and/or network utilization is dynamically stored, analyzed and then used for training a neural network. In one or more embodiments of the invention, the neural network is for example a feed-forward back-propagation neural network module that is trained to predict the resource utilization and completion of incoming client tasks and determine the server that should be utilized to execute the task. In one or more embodiments, the server to utilize for an incoming task is for example the least resource bound or least utilized.

Training the neural network may be accomplished in many ways. For example, an incoming task may have an average observed processing utilization e.g., CPU utilization of 10% and maximum memory utilization of 500 Mb for a 2 way CPU cluster of 3.2 GHz per CPU with 16 Gb of RAM. By recording resource utilization for a particular task having particular input parameters, the neural network may hence be trained for accurately recommending resource utilization for observed tasks. Specifically, when training a feed-forward back-propagation neural network inputs such a the task name and input parameters are stored and the error that occurs between the predicted resource utilization and observed resource utilization are utilized to calculate the gradient of the error of the network and to find weights for the neurons that minimize the error. This results in the neural network learning resource utilization for given tasks having given input parameters. As time passes, the neural network becomes more and more accurate at predicting resource utilization even as the size, complexity or version of the database changes.

The input parameters that are utilized with a given task may have a tremendous effect on the amount of resources such as CPU, memory, disk or network utilization that are required to execute the task. For example, if an import task is issued to an embodiment of the invention with a parameter indicating the number of records to import, then that number may have a direct correlation on the amount of CPU time and/or memory that is required to perform the task. In the simplest case, the neural network may be trained on varying import tasks, each for example with a different number of records to import. With the given input parameter varying and the resulting CPU and memory utilization recorded and submitted to the neural network, the neural network learns the significance of the input parameters.

By preemptively balancing the cluster, optimal resource utilization is achieved. The costs associated with the cluster may lowered, since less hardware in general may be utilized more fully. The latency of requests may be lowered per task, and particular often executed tasks may be directed at servers in the cluster that execute the often executed tasks faster than other servers for example.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A preemptive neural network database load balancer will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
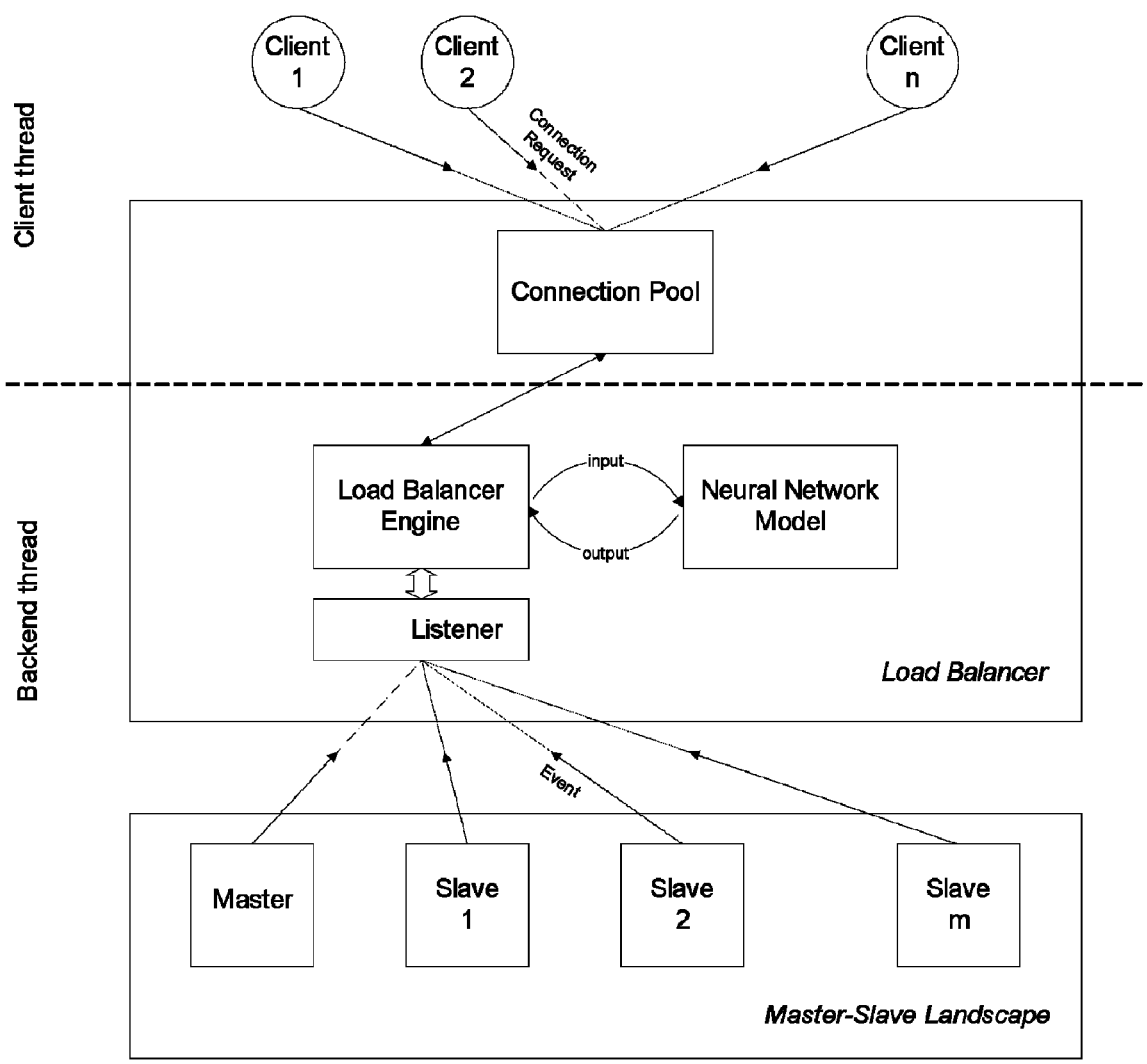
FIG. 1 is shows an architecture diagram for an embodiment of the preemptive neural network database load balancer.

FIG. 1 is shows an architecture diagram for an embodiment of the preemptive neural network database load balancer. Embodiments of the invention may simultaneously obtain many connection requests from standalone or enterprise applications, for example Client 1 through Client "n". Embodiments of the invention include three modules operating in two threads. The client thread includes the connection pool module and the backend thread includes the load balancer engine and the neural network model. Although tasks represented in FIG. 1 are shown as executing under two threads, any number of threads may be utilized as long as the functions detailed herein are executed. Use of any number of threads or processes is in keeping with the spirit of the invention.

The connection pool module operates in the client thread and is responsible for creating and caching physical connections. If this module is implemented for example on the basis of the JCA (J2EE Connection Architecture) standard then it can be used within the application server as the central mechanism for retrieving connections to enterprise data. The connection pool can interact with any enterprise application such as a portal for example deployed on the same application server or via external applications through Web Services in other embodiments of the invention. Connection pools in general allow for optimized latency since the creation of a connection is generally a time consuming process. By storing connections and handing them to incoming tasks, the connection generation process is eliminated at task execution time. This may save a second or more per incoming task for example under certain scenarios.

The load balancer engine is responsible for collection for example through a "listener" of all needed information (CPU, memory, disk, network utilization) with respect to the tasks running in the cluster of servers (shown as the lower rectangle in FIG. 1). The listener continuously collects resource utilization information from the servers via and the load balancer engine calls the neural network model in order to continuously predict which server has the lowest current and predicted loads. In effect, the neural network is continuously learning. The load balancer engine is further coupled with the neural network model. The load balancer submits task and observed resource utilization forward to the neural network model and stores and utilizes predicted results obtained from the model.

The load balancer and neural network model execute within the backend thread independently from the client thread. The neural network model obtains task information and input parameters from the load balancer engine and in addition obtains observed resource utilization and analyzes the information. The information is utilized for training the neural network to predict resource utilization for future incoming tasks. Upon request from the load balancer engine, a given task with particular input parameters results in the neural network returning predicted resource utilization to the load balancer. The load balancer then assigns the incoming task to a particular server based upon the predicted and observed resource utilization of a given server and the predicted resource utilization of the particular incoming task. The load balancer engine may in one or more embodiments attempt to keep the future resource utilization of the servers in the cluster roughly the same. For example, in one embodiment, with a given incoming read-only task predicted to take 10 seconds of CPU to complete, and with server Slave 1 and Slave "m" having a predicted current utilization of 20 more seconds and Slave 2 having a predicted current utilization of 10 more seconds, the incoming task is assigned to Slave 2. The resource to be equalized may be CPU, memory, disk or network utilization in one or more embodiments of the invention or any other resource associated with a computing element. The direction of a task to a given server in a database cluster may also attempt to optimize more than one resource at the same time, i.e., attempting to fit a CPU intensive light memory task with a light CPU and memory intensive task for example to yield roughly equal resource utilization between another server having two medium CPU/memory tasks.

In one or more embodiments, any task related to data update, for example Create, Update and Delete requests are directed to the master. This allows for one server, i.e., the "master" server to perform all write operations with "m" slave servers all performing read operation related tasks. This allows for tremendous scalability for mostly read application instances. In one or more embodiments multiple masters may be utilized and in these embodiments the neural network may also be utilized by the load balancer to preemptively optimize resource utilization between write-based servers in a cluster.

Figure 2:
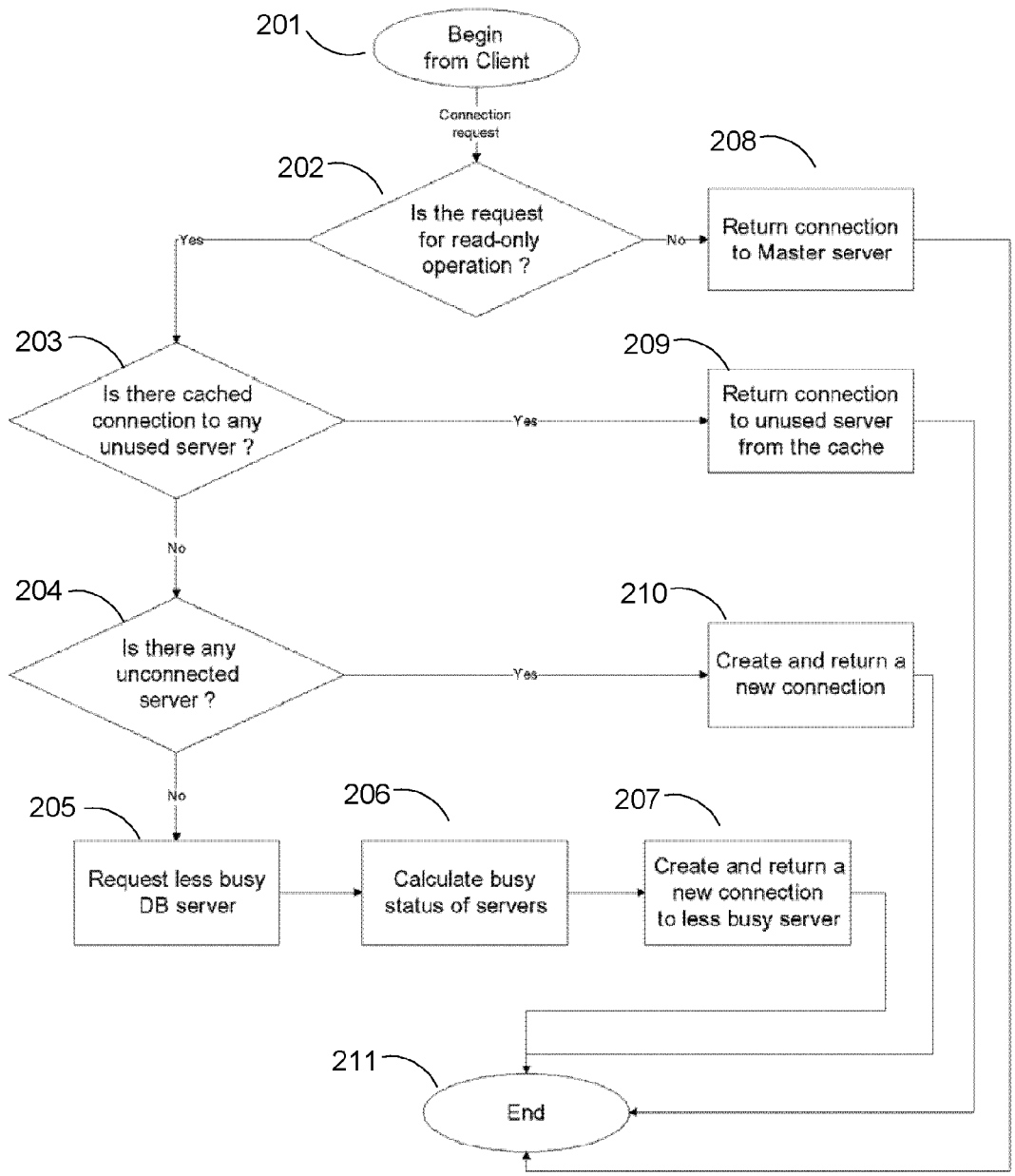
FIG. 2 shows an embodiment of a load balancing algorithm implementing a preemptive neural network database load balancer.

FIG. 2 shows an embodiment of a load balancing algorithm implementing a preemptive neural network database load balancer. The connection pool receives a request from a client for a connection to specific repository at 201. Any type of task may be requested by the client including a write-based task or a read-based task. If at 202 the incoming task, i.e., request, is for a read-only operation/task, then processing proceeds at 203. If the request is for a write-based operation, then processing continues at 208 where a connection to the master server is returned at 211. Although the embodiment shown in FIG. 2 is directed at a single master, multi-slave system, steps 202 and 208 may be eliminated in a multi-master architecture. In the case of a read-only operation, if there is cached connection to an unused server at 203, then a connection to the unused server returned at 209 and control proceeds to 211. If however at 203 there is no cached connection to an unused server, then if there is an unconnected server at 204, then a new connection is created, placed in the connection pool and returned at 210 with processing proceeding to 211. If all servers have connections as per 204, then the "least busy" database server is calculated at 205. The "least busy" database designation may calculated to include current utilization along with neural network predicted utilization of any tasks that have been forwarded to the particular server. The predicted resource utilization "busy status" of the servers is recalculated at 206. This may include update of the resource utilization to the neural network, for example with respect to a given task and the actual observed resource utilization for executing that task. If an existing connection to the "least busy" server exists, then it is returned otherwise a new connection is returned at 207 with processing continuing to 211. When a new request from a client comes in, processing begins at 201 again.

Figure 3:
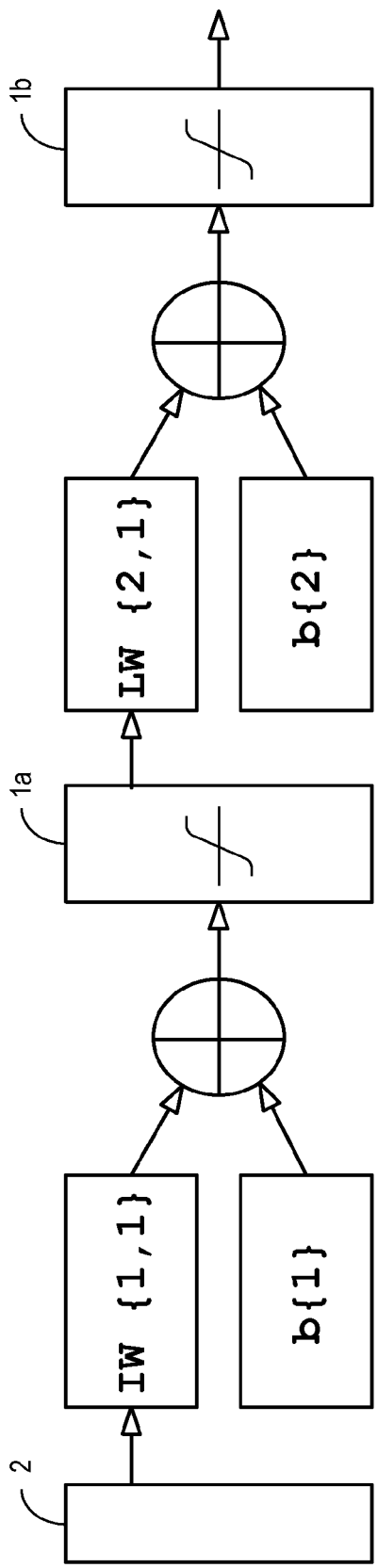
FIG. 3 shows a graphical representation of a feed-forward back-propagation neural network utilized in one or more embodiments of the invention.

FIG. 3 shows a graphical representation of a feed-forward back-propagation neural network utilized in one or more embodiments of the invention Input data 2 is received from client task requests.

The training set contains N independent (input, X1-Xn) and one dependent (output, Y) variable, where X1-Xn represents incoming tasks and optionally their input parameters:
X1=Import;
X2=Syndication;
X3=Mass Delete;
X4=Matching;
X5=Recalculate calculated fields;
X6=Search according to expression;
X7=Search with contain operators;
X8=Sorting on main table fields;
X9=Search according to qualifiers and taxonomy attributes.
. . .
Xn=any other future and/or external tasks and/or input parameters
Y=Reported task execution time.
IW—Input Weight matrices.
b—a scalar bias.
1a, 1b - the tan-sigmoid transfer functions.
The outputs of the first layer are the inputs to the second layer.
LW—output weight matrices.

The net input to the transfer functions 1a, 1b is the sum of b and the IW or LW.

The net input to the transfer function (1) is the sum of b and the IW or LW.

Targets—Data defining the desired network outputs is received from the server notification mechanism as resource utilizations associated with incoming tasks.

Outputs—Response of a network to its inputs as predicted resource utilization target values.

The network is dynamically trained on a representative set of input/target pairs. The output is utilized in defining the optimal server with the least predicted load. Any other type of neural network may be utilized with embodiments of the invention in keeping with the spirit of the invention so long as the neural network utilized is capable of predicting the amount of resource utilization for a particular task having particular input parameters based on observed resource utilization.

Other levels of feed-forward back-propagation neural network besides the two level embodiment shown in FIG. 3 are also in keeping with the spirit of the invention including instances having any number of hidden levels. When the data in the database changes over time which alters the number of records, number of images, BLOBs, PDF files, etc., the CPU execution time and memory utilization may also change depending on the particular task. As the observed values change over time, the neural network employed may thus learn and alter predictions which allows for more accurate preemptive load balancing. This may also occur less frequently when the database version changes, which may alter the execution times of various tasks.

Figure 4:
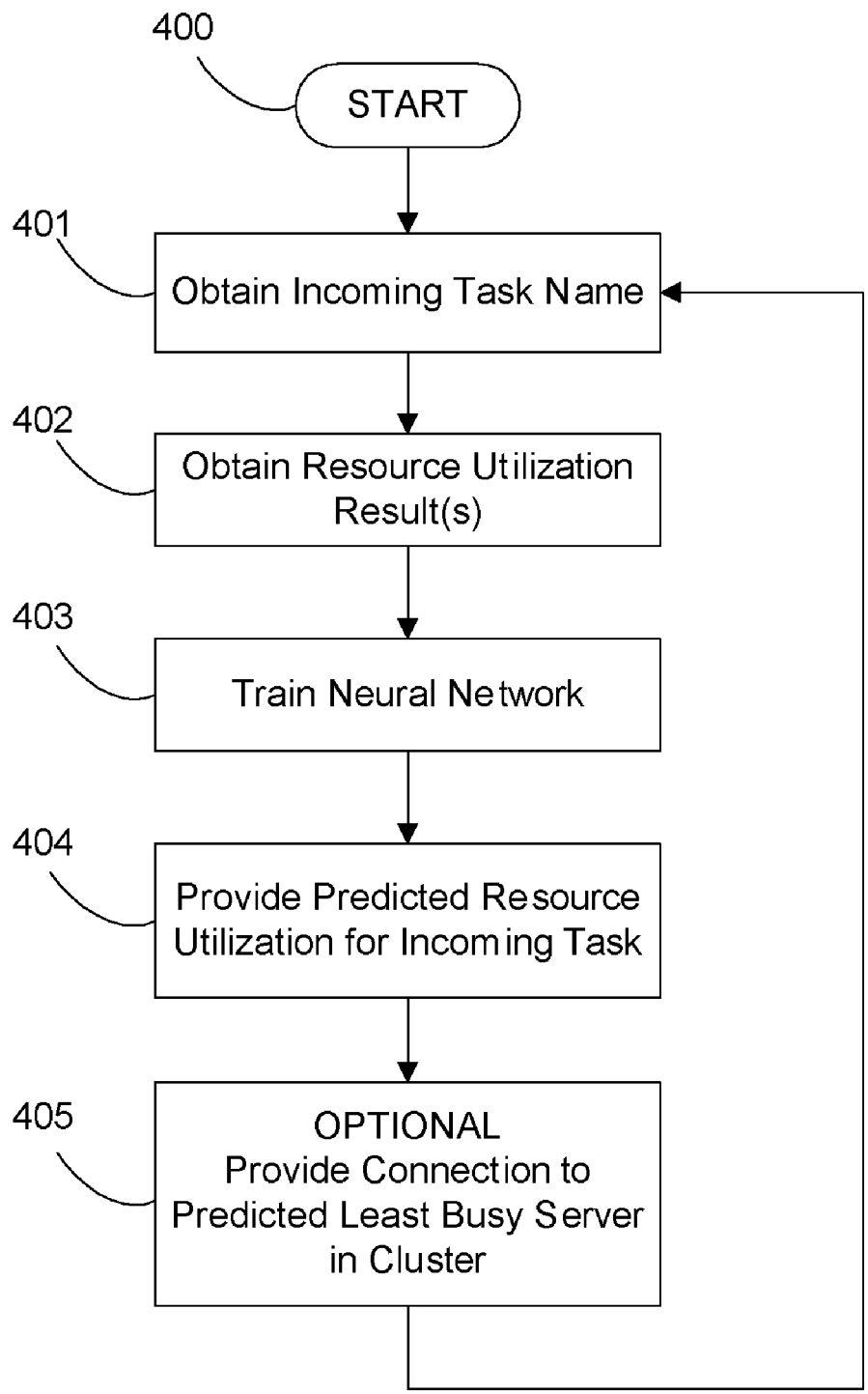
FIG. 4 shows a flow chart for an embodiment of the preemptive neural network database load balancer.

FIG. 4 shows a flow chart for an embodiment of the preemptive neural network database load balancer. Processing starts at 400. Embodiments of the preemptive neural network database load balancer may be implemented as a computer program product for example which includes computer readable instruction code that executes in a tangible memory medium of a computer or server computer. The computer program product obtains an incoming task name and a first set of associated input parameters at 401. The task name is used as a handle to associate observed and predicted resource utilization for example. The computer program product obtains a resource utilization result, i.e., an actual observed resource utilization associated with the incoming task that is executed on a database server residing in a server cluster at 402. This may involve more than one resource utilization parameter, e.g., CPU time to execute and memory. The computer program product uses the observed resource utilization result to train a neural network and the observed result is associated with the incoming task name and its set of associated input parameters at 403. The computer program product provides predicted resource utilization for an incoming task having an already observed incoming task name although the newly inbound task may utilize different input parameters at 404. The computer program product optionally provides a connection to a predicted least busy server based on the predicted resource utilization for the new incoming task at 405. This step is optional since for example a single master based architecture may store the information and learn from the information and simply provide a connection to the single master (that may be busy or not) if the task is write-based.

Figure 5:
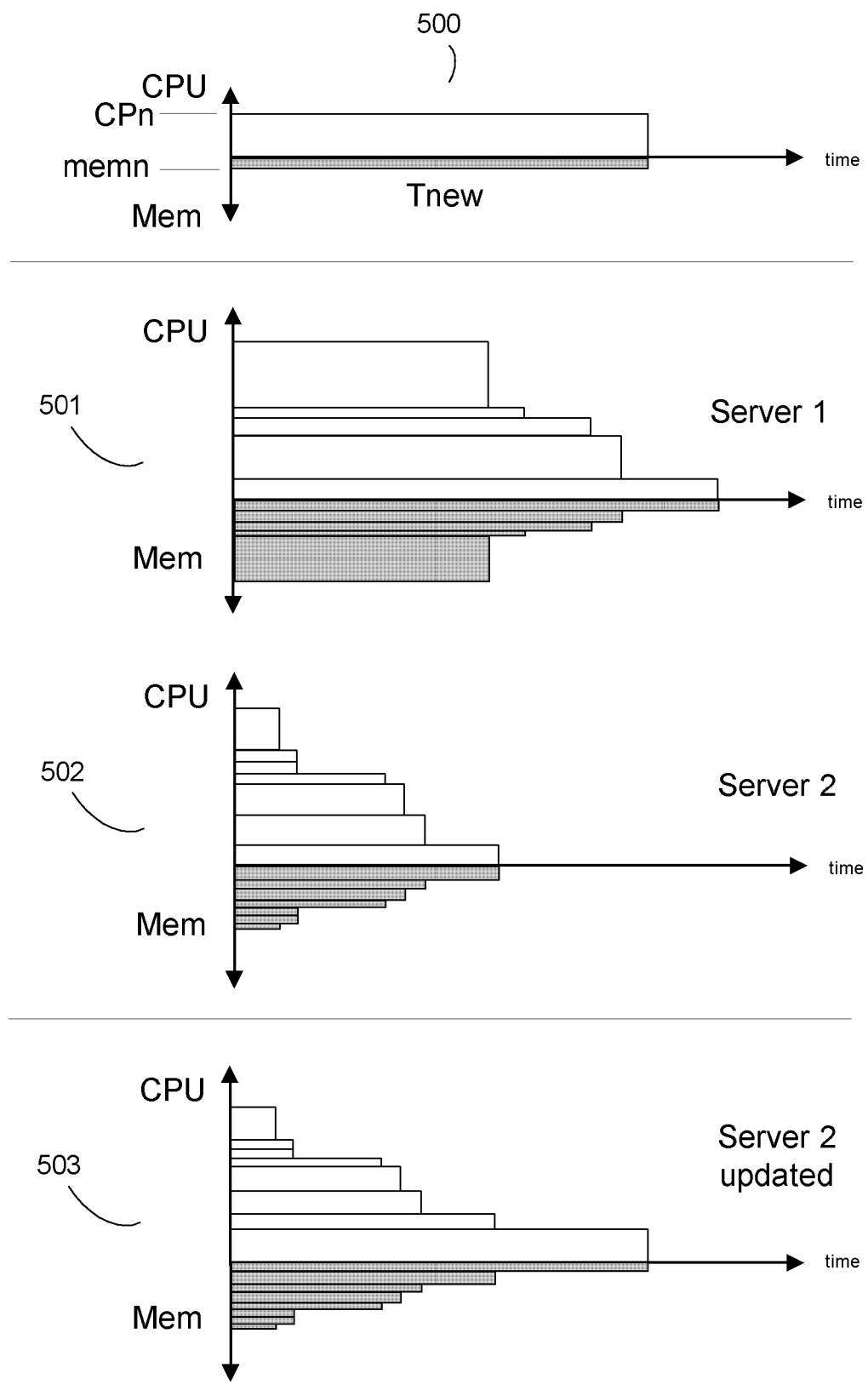
FIG. 5 shows a graphical representation of the resource utilization per unit time for the servers in a cluster.

FIG. 5 shows a graphical representation of the resource utilization per unit time for the servers in a cluster. Specifically, a new incoming task 500 that will take a certain percentage of CPU namely "CPn", on an idle server for a given execution time namely "Tnew" and that will take a certain amount of memory "memn" until the task completes. Predicted server resource utilization chart 501 shows the predicted CPU, memory utilization and completion times (that is updated when a task actually completes in one or more embodiments) of the tasks executing on a first server. Likewise, predicted server resource utilization chart 502 shows the predicted CPU, memory utilization and completion times for the tasks executing on a second server. Based on least connection scheduling, since the first server (as per 501) is executing 5 tasks and the second server (as per 502) is executing 7 tasks, incoming task 500 would be directed to the first server associated with predicted server resource utilization chart 501. Based on round robin scheduling, there is a 50-50 chance that incoming task 500 will be executed on the first server associated with predicted server resource utilization chart 501. As can be seen from predicted server resource utilization chart 501, this server is actually busier and has higher memory utilization than the second server associated with predicted server resource utilization chart 502. Since embodiments of the invention are able to predict the length of execution time of the tasks residing on each server, the preemptive neural network database load balancer directs incoming task 500 to the server associated with predicted server resource utilization chart 502. This results in the updated predicted server resource utilization chart 503 (which may be normalized in CPU percentage as the processing is spread between tasks while the memory is generally an absolute indication). Although the charts shown in FIG. 5 have memory and CPU utilization that is linear in the time axis and shows that memory utilization and CPU utilization end at precisely the same time, this is only shown in this manner for ease of illustration. Embodiments of the invention are fully capable of utilizing processing percentage and other resource utilization numbers that vary over time. For example, the memory utilization of each task may in general grow as time increases to the right in FIG. 5. Likewise, the CPU utilization may behave in a non-linear fashion since processing may delay for given intervals and then ramp up when data is available for processing. Hence, embodiments of the invention may direct tasks based on "average" CPU and memory utilizations, or in a more complex manner may interleave the tasks when there are known variations of CPU and other resource utilizations over time. This is termed resource utilization phase interleaving. For example if task 500 had a "hump" in the middle of the CPU utilization (upper portion) of the chart, then this could be taken into account and matched with a task that was in the correct phase (i.e., with a dip in the CPU utilization) at a particular time. Any other interleaving of resources when predicted variances of these parameters is to occur is in keeping with the spirit of the invention.

While the invention herein disclosed has been described by means of specific embodiments and applications thereof, numerous modifications and variations could be made thereto by those skilled in the art without departing from the scope of the invention set forth in the claims.

What is claimed is:

1. A computer program product comprising computer readable instruction code stored in a memory for execution by a computer, said computer readable instruction code configured to:

receive, at a neural network model of a database load balancer, a first incoming task name identifying a type of database task to be executed in a remote server cluster having a plurality of database servers;

receive, at the neural network model from a load balancer engine in the database load balancer, an actual resource utilization result associated with the first incoming task name when the database task identified by the first incoming task name is executed by one of the database servers in the remote server cluster;

train the neural network model based on the actual resource utilization result associated with the first incoming task name, wherein a first set of input parameters is associated with the first income task name;

provide, from the neural network model to the load balancer engine, a predicted resource utilization generated by the neural network model based on a second incoming task name, wherein said second incoming task name is associated with a second set of input parameters, and further wherein the neural network model generates the predicted resource utilization based on: (i) the second incoming task name, (ii) the second set of input parameters, and (iii) the number of records in the plurality of database servers in the remote server cluster; and identify, by the load balancer engine, based on the predicted resource utilization, one or more of the plurality of database servers to execute the database task identified by the second incoming task name.

2. The computer program product of claim 1 wherein said second incoming task name is a write-based task and wherein said second incoming task is forwarded by the load balancer to a master server in the remote server cluster.

3. The computer program product of claim 1 wherein said second incoming task name is a read-based task and wherein said second incoming task name is forwarded by the load balancer engine to a slave server in the remote server cluster.

4. The computer program product of claim 1 wherein said second incoming task name is associated with one of: an import, syndication, mass delete, matching, recalculation of a calculated field, search on expression, search with operators, search on main table fields, search with qualifiers or search with taxonomy attributes.

5. The computer program product of claim 1 wherein said neural network model comprises a feed-forward back-propagation neural network.

6. The computer program product of claim 1 wherein said actual resource utilization result includes all of central processing unit (CPU), memory, disk and network utilization.

7. The computer program product of claim 1 wherein said actual resource utilization result includes at least one of central processing unit (CPU), memory, disk or network utilization as at least one of an average, a maximum, or a minimum that (i) is linear in time or (ii) that varies over time to allow for phase interleaving.

8. The computer program product of claim 1 wherein the predicted resource utilization is based at least in part on a number of images in a database coupled with said remote server cluster.

9. The computer program product of claim 1 wherein the predicted resource utilization is based at least in part on a number of PDF files in a database coupled with said remote server cluster.

10. The computer program product of claim 1 wherein the predicted resource utilization is based at least in part on a number of BLOBs in a database coupled with said remote server cluster.

11. The computer program product of claim 1 wherein the predicted resource utilization is based at least in part on a database version of a database coupled with said remote server cluster.

* * * * *